(12) United States Patent
Isotani et al.

(10) Patent No.: US 9,327,829 B2
(45) Date of Patent: May 3, 2016

(54) METHOD OF ATTENUATING NOISE IN AIRCRAFT LANDING GEAR AND STRUCTURE

(75) Inventors: Kazuhide Isotani, Kakamigahara (JP); Kenji Hayama, Kakamigahara (JP); Toshiyuki Kumada, Amagasaki (JP); Masaru Ono, Amagasaki (JP)

(73) Assignees: THE SOCIETY OF JAPANESE AEROSPACE COMPANIES, Tokyo (JP); KAWASAKI JUKOGYO KABUSHIKI KAISHA, Hyogo (JP); SUMITOMO PRECISION PRODUCTS CO., LTD., Hyogo (JP)

( * ) Notice: Subject to any disclaimer, the term of this patent is extended or adjusted under 35 U.S.C. 154(b) by 377 days.

(21) Appl. No.: 13/255,759

(22) PCT Filed: Mar. 26, 2010

(86) PCT No.: PCT/JP2010/002209
§ 371 (c)(1),
(2), (4) Date: Oct. 25, 2011

(87) PCT Pub. No.: WO2010/116658
PCT Pub. Date: Oct. 14, 2010

(65) Prior Publication Data
US 2012/0043418 A1 Feb. 23, 2012

(30) Foreign Application Priority Data

Mar. 30, 2009 (JP) ................................. 2009-081708

(51) Int. Cl.
*B64C 23/00* (2006.01)
*B64C 25/16* (2006.01)
(Continued)

(52) U.S. Cl.
CPC ................ *B64C 25/001* (2013.01); *B64F 5/00* (2013.01); *B64C 2025/003* (2013.01); *Y10T 29/49764* (2015.01)

(58) Field of Classification Search
USPC ....... 244/102 R, 102 A, 1 N, 198, 199.1, 200, 244/200.1
See application file for complete search history.

(56) References Cited

U.S. PATENT DOCUMENTS 5,738,298 A 4/1998 Ross et al.
6,186,445 B1 * 2/2001 Batcho .......................... 244/130
(Continued)

FOREIGN PATENT DOCUMENTS

FR 2913948 A1 * 9/2008
JP A-07-117794 5/1995
(Continued)

OTHER PUBLICATIONS

International Search Report issued in Application No. PCT/JP2010/002209; Dated Jun. 15, 2010 (With Translation).

*Primary Examiner* — Christopher P Ellis
*Assistant Examiner* — George Andonyan
(74) *Attorney, Agent, or Firm* — Oliff PLC

(57) ABSTRACT

A method for attenuating aerodynamic noise from a landing gear may include researching a start point of a shear layer as a flow field characteristic of a region in the vicinity of an original shape of the landing gear, and adding a plate-shaped object in the vicinity of the start point, changing the start point to an edge portion of the plate-shaped object to make the shear layer farther from the original shape. Another method for attenuating aerodynamic noise from a landing gear may include researching a static pressure and an airflow velocity in a region in the vicinity of the landing gear as a flow field characteristic of the region, and adding a plate-shaped object covering a surface of the landing gear which is different from a surface facing an upstream side in an airflow direction, increasing the static pressure in the region to reduce the airflow velocity.

3 Claims, 12 Drawing Sheets

(51) Int. Cl.
  *B64C 25/00* (2006.01)
  *B64F 5/00* (2006.01)

(56) References Cited

U.S. PATENT DOCUMENTS

| | | | | |
|---|---|---|---|---|
| 6,619,587 | B1* | 9/2003 | Chow et al. | 244/100 R |
| 7,243,880 | B2* | 7/2007 | White et al. | 244/129.5 |
| 7,458,542 | B2* | 12/2008 | Chow et al. | 244/102 R |
| 7,484,589 | B2* | 2/2009 | Guo | 181/210 |
| 8,302,906 | B2* | 11/2012 | Chow et al. | 244/102 A |
| 2003/0164423 | A1* | 9/2003 | Courtois et al. | 244/102 R |
| 2004/0104301 | A1* | 6/2004 | Wickerhoff | B64C 7/00 244/10 |
| 2005/0011993 | A1* | 1/2005 | Konings | 244/198 |
| 2006/0032981 | A1* | 2/2006 | Fort | 244/129.4 |
| 2006/0102775 | A1* | 5/2006 | Chow et al. | 244/1 N |
| 2007/0108344 | A1* | 5/2007 | Wood | 244/102 R |
| 2008/0142634 | A1* | 6/2008 | Moe et al. | 244/1 N |
| 2009/0008501 | A1* | 1/2009 | Chow et al. | 244/100 R |
| 2010/0155529 | A1* | 6/2010 | Chow et al. | 244/1 N |

FOREIGN PATENT DOCUMENTS

| | | |
|---|---|---|
| JP | A-2006-162310 | 6/2006 |
| JP | A-2008-020357 | 1/2008 |
| JP | A-2009-509850 | 3/2009 |
| WO | WO 2005/096721 A2 | 10/2005 |

* cited by examiner

METHOD OF ATTENUATING NOISE IN AIRCRAFT LANDING GEAR AND STRUCTURE

TECHNICAL FIELD

The present invention relates to a method of attenuating noise in a designed object in aircraft. The present invention also relates to a landing gear structure of the aircraft which is intended to attenuate the noise, and the aircraft including the landing gear structure.

BACKGROUND ART

Landing gear structures used during takeoff and landing are mounted to airframe of airplane. Typically, the landing gear structures support wheels at lower end portions of main strut members supported on the airframe such that the wheels are rotatable, to allow the airplane to plane on the ground. Since the landing gear structures are required to withstand a load of the airframe during planing on the ground, each main strut member is provided with a shock absorber for absorbing the load. The main strut members are sometimes mounted to the airframe via up-down mechanisms, respectively. In this case, during flying, the main strut members and the wheels are stored into the airframe. Further, each landing gear structure includes several hydraulic devices such as a brake of the wheels and an actuator of the up-down mechanism. Components of the main strut member, the up-down mechanism, etc., are attached with tubes and the like to feed hydraulic oil to these hydraulic devices.

As should be understood from the above, the landing gear structure has a complex configuration including a variety of components. Aerodynamic noise emanating from the landing gear structure is one cause of noise generated from the airplane during takeoff and landing. To attenuate this, a variety of proposals have been made heretofore. For example, a landing gear structure disclosed in Patent Literature 1 includes a fairing for covering the entire of underside and forward side of the landing gear structure. It may be considered that the fairing allows the landing gear structure to avoid direct contact with a high-velocity airflow, thereby attenuating the noise emanating from the landing gear structure. It may also be considered that the fairing serves as a noise-proof wall for blocking the aerodynamic noise emanating from the landing gear structure which would otherwise be transmitted to outside.

CITATION LISTS

Patent Literature

Patent Literature 1: International Publication 05/096721 pamphlet

SUMMARY OF THE INVENTION

Technical Problem

However, in the above stated configuration in which the landing gear structure is entirely covered with the fairing, the components of the landing gear structure are not easily accessible. For the purpose of safe operation of airplane, the landing gear structure is inspected frequently. Because of difficulty in accessibility, the inspection of the landing gear structure results in a messy work. In addition, there is a need for a larger-sized fairing to cover the entire of forward side and underside of the landing gear structure. This leads to an increase in a weight of the overall airplane.

Under the circumstances, an object of the present invention is to provide a method of attenuating noise of a designed object in aircraft such that ease of maintainability of the object designed by this method is not lessened and an increase in a weight of the overall aircraft is suppressed. Another object of the present invention is to provide a landing gear structure of the aircraft which is designed in this manner and the aircraft including the landing gear structure.

Solution to Problem

The present invention has been developed under the circumstances, and according to the present invention, a method of attenuating noise of aircraft according to a first aspect comprises researching a start point of a shear layer as a flow field characteristic of a region in the vicinity of an original shape of a designed object; and adding a plate-shaped object in the vicinity of the start point of the shear layer to change the start point of the shear layer to an edge portion of the plate-shaped object to make the shear layer physically farther from the original shape added with the plate-shaped object, thereby attenuating aerodynamic noise of the designed object.

According to the present invention, a method of attenuating noise of aircraft according to a second aspect comprises: researching a static pressure and an airflow velocity in a region in the vicinity of an original shape of a designed object as a flow field characteristic of the region in the vicinity of the original shape; and adding a plate-shaped object for covering a surface of the original shape which is different from a surface of the original shape facing an upstream side in an airflow direction to increase the static pressure in the region in the vicinity of the original shape to reduce the airflow velocity, thereby attenuating aerodynamic noise of the designed object.

In accordance with these methods, the flow field in the region in the vicinity of the designed object can be controlled and aerodynamic noise emanating from the designed object can be attenuated. The noise can be attenuated merely by adding the plate-shaped object to the original shape based on the researched flow filed characteristic. This reduces a chance that ease of maintainability of the designed object is lessened, and minimizes an increase in the weight of the aircraft.

According to the present invention, a landing gear structure of aircraft according to a first aspect comprises a main strut member for supporting wheel components; an up-down mechanism for moving up and down the main strut member; and a first noise attenuating section for attenuating aerodynamic noise of the up-down mechanism; wherein the up-down mechanism includes a member exposed outside airframe when the main strut member is moved down; and wherein the first noise attenuating section has a plate shape and is provided continuously with the exposed member to change a position of a start point of a shear layer in a region in the vicinity of the exposed member.

In accordance with this configuration, since the start point of the shear layer at the exposed member is changed by the first noise attenuating section and the shear layer is made physically distant from the exposed member, aerodynamic noise of the exposed member can be attenuated. Since the plate-shaped object is provided continuously with the exposed member, a chance that ease of maintainability of the up-down mechanism is lessened can be reduced, and an increase in the weight of the aircraft can be minimized.

The first noise attenuating section may be integral with the exposed member of the up-down mechanism.

According to the present invention, a landing gear structure of aircraft according to a second aspect comprises a main strut member for supporting wheel components at a tip end portion thereof; a functional component provided at the main strut member; and a second noise attenuating section for attenuating aerodynamic noise of the functional component; wherein the second noise attenuating section has a plate shape, and covers lateral side of the functional component and lateral side of the main strut member.

According to the present invention, the landing gear structure of aircraft according to a third aspect, further comprises a main strut member for supporting wheel components at a tip end portion thereof; a functional component provided at the main strut member and sandwiched between the wheel components; and a third noise attenuating section for attenuating aerodynamic noise of the functional component; wherein the third noise attenuating section has a plate shape, is positioned between the wheel components, and covers underside of the functional component.

In accordance with this configuration, the airflow velocity can be reduced by increasing the static pressure in a region in the vicinity of the side surface or lower surface of the functional component, and thus aerodynamic noise of the functional component can be attenuated. Since the side surface or lower surface of the functional component is merely covered with the plate-shaped object, a chance that ease of maintainability of the designed object is lessened can be reduced, and an increase in the weight of the aircraft can be minimized.

The main strut member may include a cylinder portion supported on the airframe and a rod portion protrusively stored into the cylinder portion; and the functional component may include a support link provided between the cylinder portion and the rod portion such that the support link extends over the cylinder portion and the rod portion.

The support link may include a first arm coupled to the rod portion, and a second arm coupled to the cylinder portion such that the second arm is pivotally attached to the first arm; the second noise attenuating section includes a first side plate fastened to the first arm, and a second side plate fastened to the second arm and positioned closer to the main strut member relative to the first side plate; and the second side plate is movable in a lengthwise direction of the main strut member according to movement of the rod portion protruding from and stored into the cylinder portion.

The functional component may include an axle for supporting the wheel components such that the wheel components are rotatable.

A landing gear structure of aircraft of the present invention may be formed by combining two or more of the landing gear structures of the aircraft according to the first to third aspects.

Aircraft of the present invention may include the above stated landing gear structure.

The above and further objects, features and advantages of the present invention will more fully be apparent from the following detailed description with accompanying drawings.

Advantageous Effects of the Invention

In accordance with the present invention, the noise of the designed object of the aircraft can be attenuated such that a chance of lessening ease of maintainability of the designed object can be reduced, and an increase in the weight of the overall aircraft can be suppressed. In addition, in accordance with the present invention, the landing gear structure which can achieve the above advantages and aircraft including the landing gear structure can be provided.

BRIEF DESCRIPTION OF THE DRAWINGS

FIGS. 5A to 5E are views of analysis results of a flow field characteristic of a region in the vicinity of a side link, in which FIG. 5A is a view showing a cross-section analyzed by CFD analysis, and FIGS. 5B to 5E are contour views showing flow field data in the analyzed cross-section shown in FIG. 5A.

FIGS. 6A to 6K are views of analysis results of a flow field characteristic of a region in the vicinity of a support link, in which FIG. 6A is a view showing a cross-section analyzed by CFD analysis, and FIGS. 6B to 6K are contour views showing flow field data in the analyzed cross-section shown in FIG. 6A.

FIGS. 7A to 7D are views of analysis results of a flow field characteristic of a region in the vicinity of an axle, in which FIG. 7A is a view showing a cross-section analyzed by CFD analysis, and FIGS. 7B to 7D are contour views showing flow field data in the analyzed cross-section shown in FIG. 7A.

FIGS. 12A and 12B are graphs each showing the noise characteristics of the landing gear structure of FIG. 8, in which FIG. 12A is a graph showing the noise characteristics of the side link and FIG. 12B is a graph showing the noise characteristics of a tip end portion of a main strut member.

DESCRIPTION OF THE EMBODIMENTS

Hereinafter, embodiments of the present embodiment will be described with reference to the drawings.

[Noise Attenuating Method]

Figure 1:
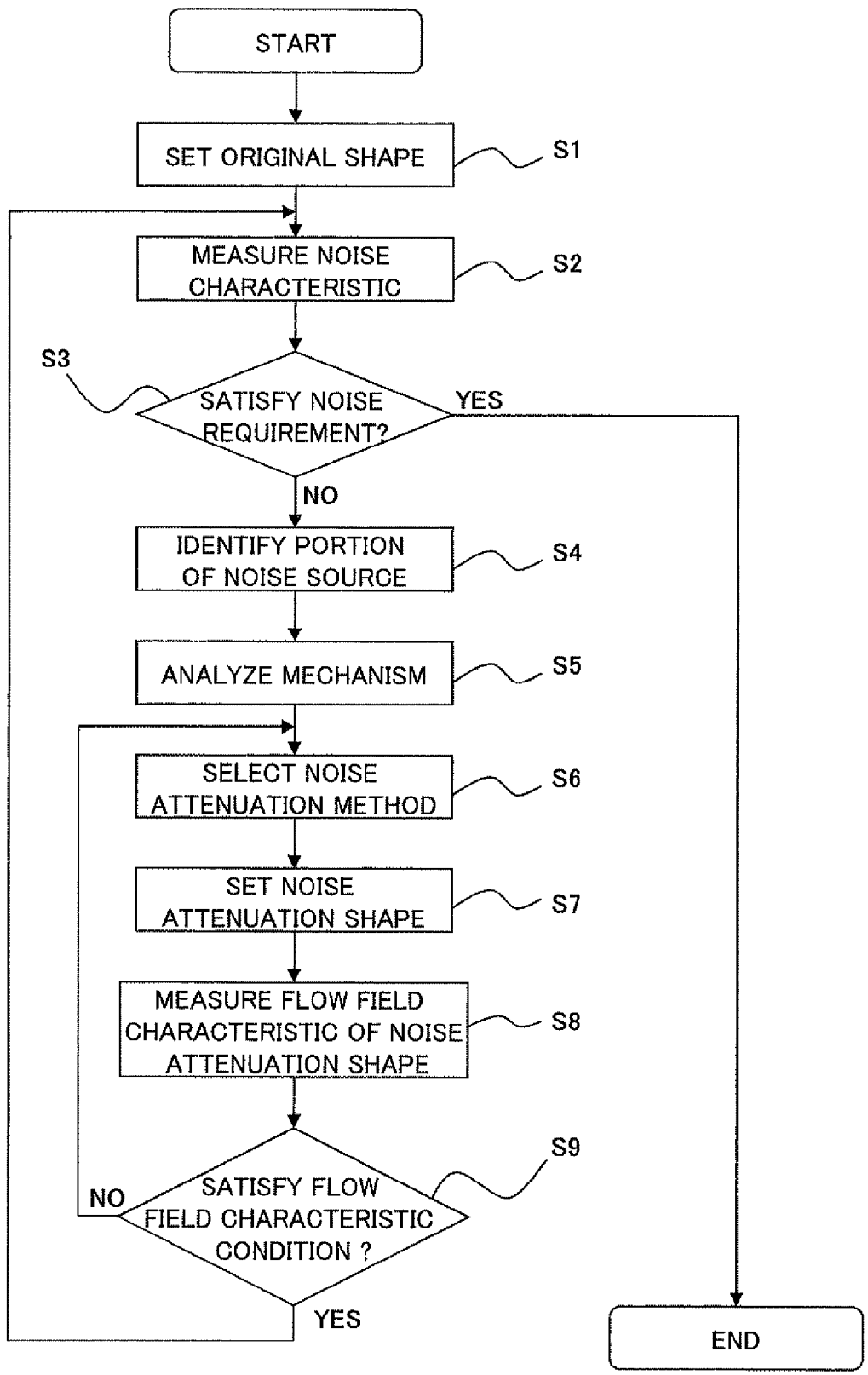
FIG. 1 is a flowchart showing a method of attenuating noise in aircraft of the present invention.

First of all, a method of attenuating noise in a designed object of aircraft will be described with reference to FIG. 1. In this method, initially, an original shape of the designed object is defined (step S1). The term "original shape" refers to a shape before changing a design to attenuate the noise, i.e., a conventional typical shape.

Then, a noise characteristic of the designed object is measured (step S2). It is determined whether or not the measured noise characteristic satisfies a noise requirement level which is necessary (step S3). The "noise characteristic" includes, for example, a sound pressure level. As an indicator of the "noise requirement," for example, an overall sound pressure level is used. In such a case, in step S3, it is determined whether or not the overall sound pressure level measured in step S2 is not higher than a predetermined noise requirement. The term "measurement of the noise characteristic" is meant to include calculation of the noise characteristic through computer analysis and actual measurement of the noise characteristic in a wind-tunnel test using actual aircraft or a model of the aircraft.

If it is determined that the measured noise characteristic does not satisfy the noise requirement, a site (portion) of the original shape which is a noise source is identified (step S4). A noise generation mechanism in the identified noise source is analyzed (step S5). The "identification" and "analysis of the noise generation mechanism" are meant to include a process executed based on computer programs and analysis conducted by the wind-tunnel test.

In step S4, for example, a component or a component group is extracted one by one from the original shape, the shape of the component or component group is defined in each stage, and a difference between noise levels of shapes corresponding to adjacent stages is measured. More specifically, a first shape is defined as a shape in a stage in which a component group A is extracted from the original shape, and a second shape is defined as a shape in a stage in which a component group B is extracted from the original shape. After that, in the same manner, shapes up to n-th shape are defined. Then, a difference between the noise level of the original shape and the noise level of the first shape is measured, and a difference between the noise level of the first shape and the noise level of the second shape is measured. After that, in the same manner, n differences in total are measured. In general, in a case where the original shape is not particularly noise-proof, there is a tendency that the noise level decreases as the components removed therefrom increases in number, and that a shape corresponding to a higher level of two levels between which the difference is measured has more components than a shape corresponding to a lower level of the two levels. Then, it is determined whether or not each difference measured is higher than a predetermined level. If a certain difference is higher than the predetermined level, a component or component group which is included in the shape corresponding to the higher noise level but is not included in the shape corresponding to the lower noise level is extracted, and the extracted component or component group is identified as the noise source. As used herein, the "noise level" includes the overall sound pressure level, a sound pressure level of 1/n octave band center frequency, A-weighted sound pressure level, a combination of them, etc.

In step S5, for example, plural kinds of flow field data in a region in the vicinity of the identified noise source is measured. In the present embodiment, "flow field data" includes a distribution of a velocity fluctuation, a distribution of a pressure fluctuation, and others. These flow field data are calculated by the CFD analysis or the wind-tunnel test. Based on the plural kinds of flow field data measured in this way, the noise generation mechanism in the noise source is analyzed.

The "noise generation mechanism" obtained in step S5 includes several patterns: (1) "airflow (air current) velocity in a region in the vicinity of the noise source is a high velocity," (2) "airflow fluctuation in a region in the vicinity of the noise source is great," and (3) "separation from the airflow appears at a front edge of the noise source (end edge at upstream side in an airflow direction), and a shear layer resulting from the separation is close to a rear portion of the noise source (portion at downstream side in an airflow direction)", etc. Regarding the third mechanism, there is a characteristic in which if there exists an object within or in the vicinity of an airflow fluctuating, that airflow fluctuation is easily radiated as a sound. Since the shear layer resulting from the separation has a great airflow fluctuation, the object present within or in the vicinity of this shear layer brings about an increase in a sound radiation efficiency, thereby increasing the noise.

Then, according to the analyzed mechanism, a design changing method for attenuating the noise in the noise source is selected (step S6). According to the selected method, an object for attenuating the noise is added to the noise source (step S7).

If the mechanism is the above (1) or (2), a design changing method is selected in which a wall surface is formed in the vicinity of the noise source to reduce the airflow velocity in the region in the vicinity of the noise source and lessen the airflow fluctuation in the region in the vicinity of the noise source. In other words, this changing method is different from a design changing method in which a surface of the portion which is the noise source is entirely covered, the surface facing upstream side in the airflow direction (hereinafter simply referred to as "front surface"), to avoid high-velocity airflow from directly contacting the noise source, or a design changing method in which the entire shape of the noise source is transformed into a streamline shape, for the purpose of fairing the airflow in the region in the vicinity of the noise source to lessen the fluctuation. In the present embodiment, the design changing method, in which a surface of the noise source which is different from the front surface is covered with the wall, is selected. And, a plate-shaped object forming such a wall surface is added to the noise source in step S7. This plate-shaped object is added to the noise source so that a static pressure in the region in the vicinity of the noise source increases. By increasing the static pressure in this way, the airflow velocity is reduced effectively.

After adding the plate-shaped object, flow field data in the region in the vicinity of the noise source is measured (step S8). The flow field data in the region in the vicinity of the noise source measured based on the original shape in step S5 is compared to the flow field data in the region in the vicinity of the noise source measured in step S7 to determine whether or not a flow field characteristic of the shape formed by adding the plate-shaped object satisfies a predetermined condition (step S9). The flow field data to be compared are an airflow velocity distribution and a pressure distribution in the region in the vicinity of the noise source which is a factor of the noise generation mechanism. The "condition" used for the determination includes (1) "the airflow velocity in the region in the vicinity of the noise source is decreased by a predetermined velocity by adding the plate-shaped object to the noise source", (2) "a secondary increase in the airflow velocity in a region in the vicinity of a portion different from the noise source, which increase could be caused by adding the plate-shaped object, is less", etc.

If it is determined that the flow field characteristic does not satisfy the condition, the process returns to step S7, and the shape of the plate-shaped object is changed. After that, step S8 and step S9 are attempted again. For example, in a case where the condition (2) is not met and thereby the process returns to step S6, it is preferred that the shape of the plate-shaped object covering the noise source is suitably changed by, for example, providing an open portion at a downstream portion of the plate-shaped object. If the downstream portion is entirely closed, the airflow velocity might increase secondarily at outer side of the wall surface of the plate-shaped object. Therefore, it is presumed that the overall noise could be attenuated by providing the open portion at the downstream portion. From these facts, there could be a trade-off between the shape satisfying the condition (1) and the shape satisfying the condition (2). A dimension of the plate-shaped object in the airflow direction is decided so that these conditions are both satisfied.

If it is determined that the flow field characteristic satisfies the condition in step S9, a noise characteristic of the noise source is re-measured, using the shape formed by adding the plate-shaped object (step S2). It is determined whether or not the re-measured noise characteristic satisfies the noise requirement (step S3). If it is determined that the re-measured noise characteristic satisfies the noise requirement, then the process terminates. If not, the process returns to step S4 and the above procedure is repeated.

On the other hand, if the mechanism analyzed in step S5 is the above (3), in step S6, a design changing method is selected in which a position of a start point of the shear layer is changed. In other words, like the above case, this method is different from the method in which the front surface of the noise source is entirely covered or the entire shape of the noise source is transformed into a streamline shape to minimize the separation in the region in the vicinity of the noise source. In this case, the design changing method is such that the position of the start point of the shear layer is changed by, for example, increasing a width of the front edge of the noise source. In step S7, a plate-shaped object for changing the position of the start point is added to the front edge of the noise source. This plate-shaped object is added to the noise source so that the position of the start point of the shear layer is changed to an outward side in a widthwise direction of the noise source, thereby making the rear portion of the noise source distant from the shear layer.

After adding the plate-shaped object in this way, flow field data in the region in the vicinity of the noise source is measured (step S7). The flow field data in the region in the vicinity of the noise source measured in step S5 using the original shape defined in step S1 is compared to the flow field data in the region in the vicinity of the noise source measured in step S7 to determine whether or not the flow field characteristic of the shape formed by adding the plate-shaped object satisfies a predetermined condition (step S8). The flow field data to be compared are an airflow velocity distribution in the region in the vicinity of the noise source which is a factor of the noise generation mechanism. The "condition" used for the determination includes "shear layer is a predetermined distance away from the noise source", etc.

If it is determined that the flow field characteristic does not satisfy the condition, the process returns to step S6, and the shape of the plate-shaped object is changed. After that, step S7 and step S8 are attempted again. If it is determined that the flow field characteristic satisfies the condition in step S8, a noise characteristic of the noise source is re-measured using the shape formed by adding the plate-shaped object (step S2). It is determined whether or not the re-measured noise characteristic satisfies the noise requirement (step S3). If it is determined that the re-measured noise characteristic satisfies the noise requirement, then the process terminates. If not, the process returns to step S4 and the above procedure is repeated.

The procedure in the above steps S6~S9 are meant to include a process executed based on computer programs and analysis conducted by the wind-tunnel test.

As should be appreciated from the above, the present method is different from the method in which the airflow is prevented from contacting the noise source by entirely covering the upstream side of the noise source in the airflow direction, but is such that the airflow velocity is reduced by adding the plate-shaped object to the noise source or the shear layer is made farther from the noise source. For this reason, a structure for attenuating the noise does not substantially increase in size, and a weight of the designed object does not substantially increase, unlike the prior art example. The noise can be reduced by the present method even in a case where a space for disposing the conventional structure for attenuating the noise cannot be sufficiently ensured at upstream side of the noise source in the airflow direction.

[Landing Gear Structure]

Hereinafter, description will be given of a case where the landing gear structure of the airplane is the designed object, as a specific example. Note that the stated directions of the landing gear structure are referenced from the perspective of the state where the landing gear structure is mounted to the airplane as the aircraft, and the upstream side in the airflow direction is forward side.

Figure 2:
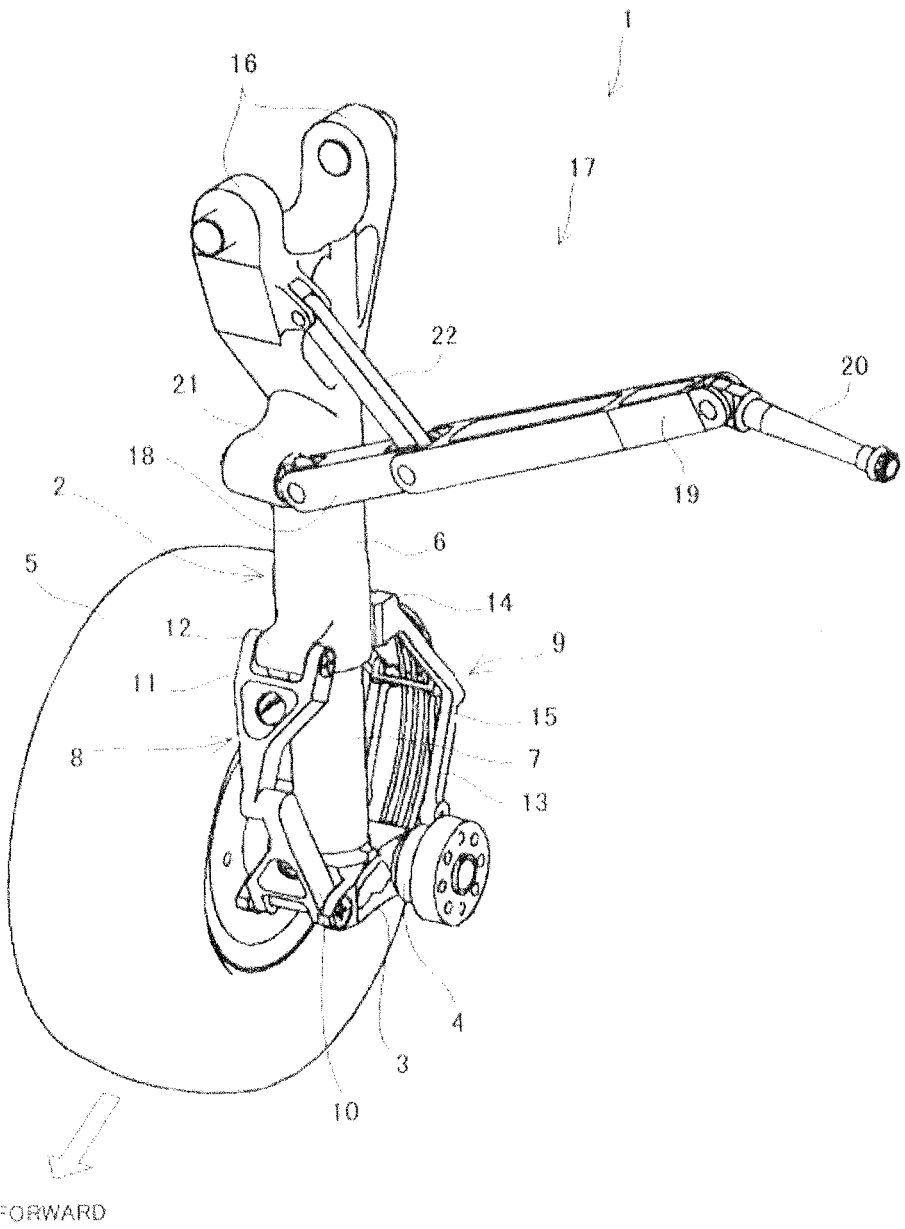
FIG. 2 is a perspective view showing an original shape of a landing gear structure of airplane.

Firstly, a schematic configuration of the landing gear structure will be described using the conventional original shape with reference to FIG. 2. A landing gear structure 1 includes a main strut member 2 supported at a lower portion of the airframe of the airplane. An axle 4 extending in a rightward and leftward direction is mounted to a tip end portion of the main strut member 2 via a bracket 3. Wheel components 5 are mounted to both end portions of the axle 4. In FIG. 2, only the wheel component at one side is depicted for the sake of convenience of explanation.

The main strut member 2 constitutes an oleo-pneumatic shock absorber and is extendable and contractible in its lengthwise direction. To be specific, the main strut member 2 includes a cylinder 6 supported on the airframe and a rod 7 provided at a tip end portion of the cylinder 6 such that the rod 7 is protrusively stored (stowed) into the cylinder 6. The bracket 3 is fastened to a tip end portion of the rod 7. A piston (not shown) is provided at a base end portion of the rod 7 such that the piston is slidable within the cylinder 2 along its axial direction. In the interior of cylinder 6, an oil chamber is formed at an upper surface side of the piston. In a state where the wheel component 5 is away from the ground, the piston is pushed down by oil and high-pressure gas within the oil chamber and the rod 7 protrudes from the cylinder 6. In a state where the wheel component 5 is in contact with the ground, the oil and the high-pressure gas within the oil chamber by a load applied upward to the wheel component 5, thereby allowing the rod 7 to be stored into the cylinder 6.

Between the cylinder 6 and the rod 7, a pair of front and rear support links 8 and 9 are provided to extend thereover. The front support link 8 includes a first arm 10 at the cylinder 6 side and a second arm 11 at the rod 7 side which are vertically pivotally coupled to each other. The first arm 10 is pivotally attached at one end portion thereof to a front end portion of the bracket 3, and extends obliquely forward and upward from the attached portion. The first arm 10 is pivotally coupled at an opposite end portion thereof to one end portion of the second arm 11. The second arm 11 extends obliquely rearward toward the main strut member 2. A mounting portion 12 protruding forward and rearward is provided integrally on an outer peripheral surface of the main strut member 2. The second arm 11 is mounted to the mounting portion 12. The rear support link 9 has a similar structure. The rear support link 9 and the front support link 8 are disposed symmetrically in a substantially forward and rearward direction with respect to an axis of the main strut member 2. Reference number 13 designates a first arm of the rear support link 9, while reference number 14 designates a second arm of the rear support link 9. Tubes 15 are mounted to the first and second arms 13 and 14 of the rear support link 9 to feed and discharge hydraulic oil with respect to hydraulic devices which are not shown and disposed at the wheel component 5 side.

A pair of flanges 16 are provided integrally with the base end portion of the main strut member 2. The flanges 16 are pivotally attached to a lower portion of the airframe. The landing gear structure 1 is provided with an up-down mechanism 17 to enable the landing gear structure 1 to be pivoted between a state where the main strut member 2 and the wheel components 5 are lifted up and stored into the airframe, and a state where the main strut member 2 and the wheel component 5 protrude downward from the airframe. The up-down mechanism 17 includes first to third side links 18~20 connected to each other between the main strut member 2 and the airframe. The first side link 18 is pivotally attached at one end portion thereof to a mounting portion 21 provided integrally on the outer peripheral surface of the cylinder 6. The third side link 20 is pivotally attached at an opposite end portion thereof to the airframe. The side links 18~20 are pivotally coupled to each other. The side links 18~20 are stretched as shown in FIG. 2, and thereby the main strut member 2 protrudes downward, thereby allowing the airplane to be deployed for takeoff and landing. In a state where the side links 18~20 are folded, the main strut member 2 is lifted up and stored into the airframe. The up-down mechanism 17 has a strut 22 pivotally operative in response to the operation of the first to third side links 18~20. The strut 22 is stretched together with the first to third side links 18~20 stretched shown in FIG. 2. This enhances stiffness of the main strut member 2. In the state where the main strut member 2 protrude downward for takeoff and landing, at least the second side link 19 is positioned outside the airframe, and its front surface faces upstream side in the airflow direction.

Figure 3:
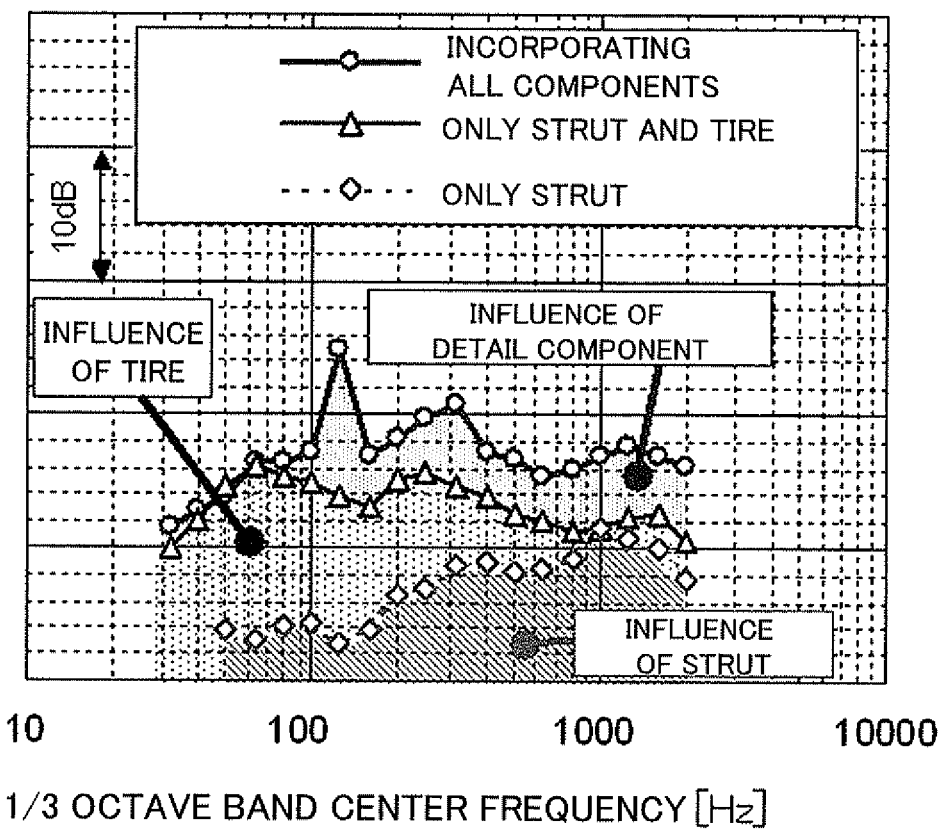
FIG. 3 is a graph showing noise characteristics of the landing gear structure of the original shape of FIG. 2.

The noise characteristics shown in FIG. 3 are obtained by measurement based on the wind-tunnel tests using scale models. In FIG. 3, sound pressure levels of a ⅓ octave band center frequency are exemplarily depicted. Among three lines, an upper line indicates the noise characteristic in a case of the landing gear structure 1 having all components of the original shape, an intermediate line indicates the noise characteristic of a shape formed by detaching a component group from the original shape so that only the main strut member 2, the bracket 3, the axle 4 and the wheel component 5 are left, and a lower line indicates the noise characteristic of a shape formed by further detaching the axle 4 and the wheel component 5 from the shape corresponding to the intermediate line. As can be seen from FIG. 3, a sound pressure level in the same frequency band is lower as the components are fewer in number. An area defined by a bold line and a thin line implies an influence of noise originating from components (hereinafter these are collectively referred to as "detail components") other than the main strut member 2, the bracket 3, the axle 4 and the wheel component 5. An area defined by the thin line and a dotted line implies an influence of a noise originating from the bracket 3, the axle 4 and the wheel component 5. From this, it is found out that in the landing gear structure 1, the detail components are one main noise source.

Figure 4:
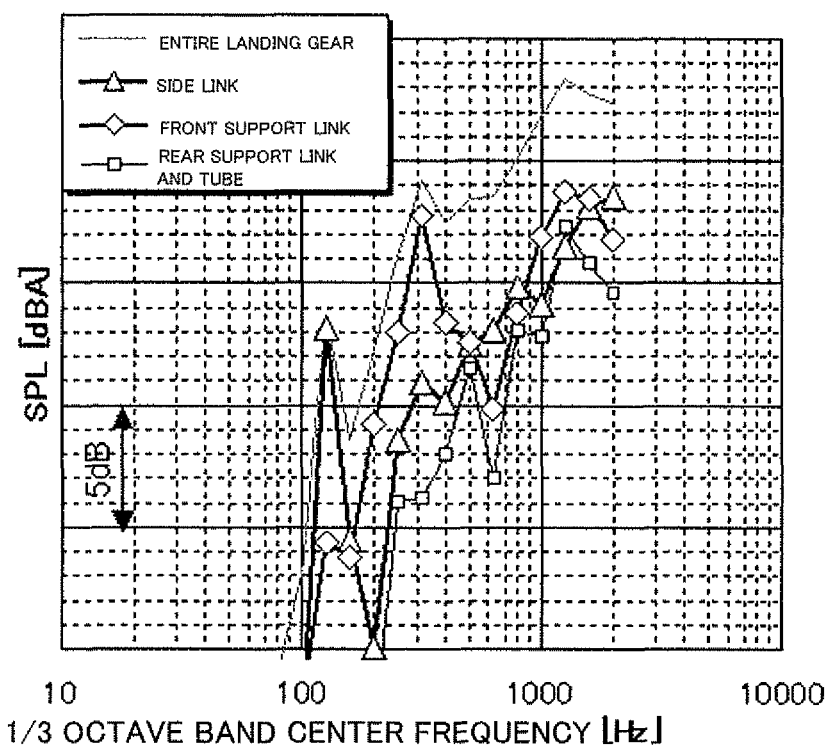
FIG. 4 is a graph showing noise characteristics of detail components of the landing gear structure of the original shape of FIG. 2.

FIG. 4 indicates the noise characteristics of the detail components obtained by measurement based on the similar wind-tunnel tests. In FIG. 4, A-weighted sound pressure levels of the ⅓ octave band center frequency are exemplarily depicted. A thin line indicates the noise characteristic in the case of the landing gear structure 1 having all of the components of the original shape. A line connecting triangular plots indicates the noise characteristic of the first to third side links 18~20. A line connecting rhombic plots indicates the noise characteristic of the front support link 8. A line connecting rectangular plots indicates the noise characteristic of the rear support link 9 and the tube 15. As can be seen from FIG. 4, the first to third side links 18~20, and the front support link 8 are each a main cause of the noise of the landing gear structure 1 in a specific frequency band. It is presumed that the second side link 18, among the first to third side links 18~20, which is positioned outside the airframe during takeoff and landing, is highly possibly a main cause of the noise source. From this, the second side link 18, the front support link 8 and the tip end portion of the main strut member 2 are identified as the portions which become the noise sources of the landing gear structure.

FIGS. 5 to 7 indicate flow field data in cases where the regions in the vicinity of the portions which become the noise sources are expressed as analyzed cross-sections, respectively. FIGS. 5B to 5E indicate flow field data in the case where a plane transversely sectioning the second side link 19 is an analyzed cross-section A1 (see FIG. 5A). FIGS. 6B to 6K indicate flow field data in the case where a plane sectioning the front and rear support links 8 and 9 in a direction perpendicular to the extending direction of the main strut member 2 in a state where a stroke of the rod 7 is maximum is an analyzed cross-section A2 (see FIG. 6A). FIGS. 7B to 7D indicate flow field data in the case where a plane sectioning the axle 4 and being parallel to the analyzed cross-section A2 of FIG. 6A is an analyzed cross-section A3 (see FIG. 7A). These flow field data are each obtained by CFD analysis of a landing gear structure of a size which is substantially the same as that of the model used in the above wind-tunnel test, and frequency analysis results described later correspond to frequencies of actual airplane.

Figure 5A:
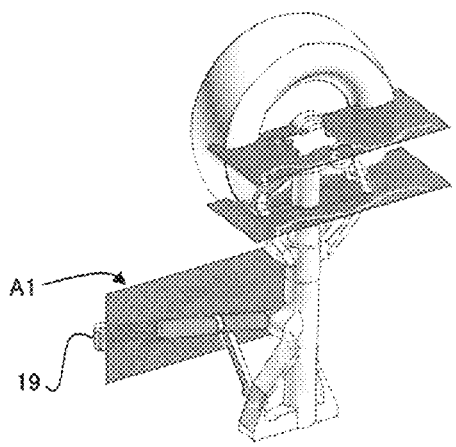
Figure 5B:
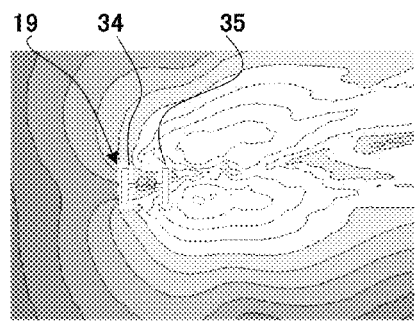
Figure 5D:
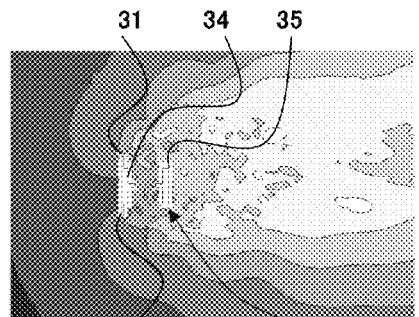
Figure 5C:
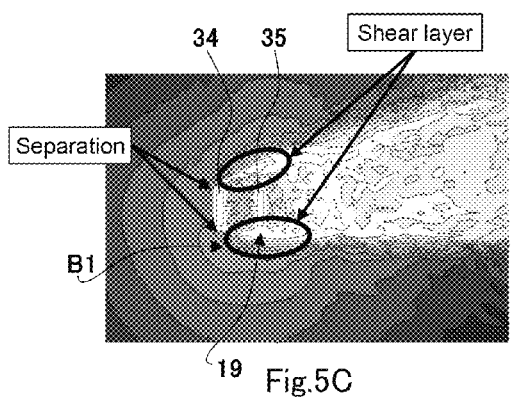

FIGS. 5B and 5C are contour views indicating frequency analysis results of a pressure fluctuation in the analyzed cross-section A1 of the original shape. FIG. 5B indicates the analysts result at 125 Hz, while FIG. 5C indicates the analysts result at 1000 Hz. FIGS. 5B and 5C indicate that a pressure fluctuation is greater in a region more lightly colored. Regarding the contour view indicating the analysis result in the pressure fluctuation, the same applies to other views. With reference to FIG. 5B, a pressure fluctuation is great in a region behind the second side link in a low-frequency band. With reference to FIG. 5C, a shear layer B1 starting from the front edge of the second side link 18 appears and extends rearward therefrom. The shear layer B1 extending rearward is present in close proximity to a lateral side of the second side link 18. In other words, it is presumed that the noise generation mechanism of the second side link 18 is such that the noise is generated due to the close proximity between the second side link 18 and the shear layer B1, and corresponds to the mechanism of the (3) described above with reference to FIG. 1.

Figure 6A:
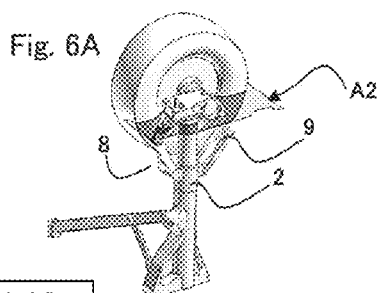
Figures 6B, 6C:
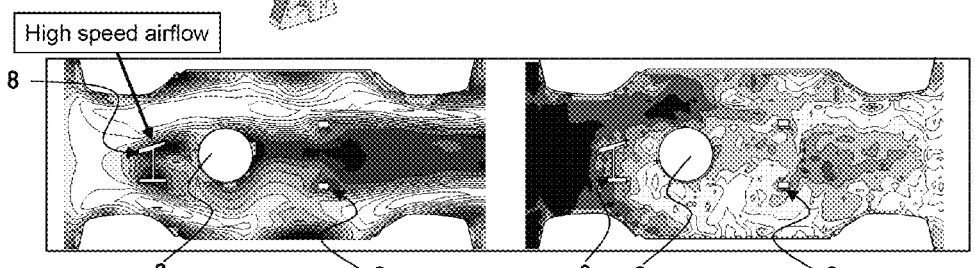

FIG. 6B is a contour view showing an average velocity distribution in the analyzed cross-section A2 of the original shape. FIG. 6C is a contour view showing a frequency analysis result (1000 Hz) of a pressure fluctuation in the analyzed cross-section A2 of the original shape. In FIG. 6B, the airflow velocity is higher in a region colored more lightly. With reference to FIG. 6B, the airflow velocity is high at lateral side of the front and rear support links 8 and 9. With reference to FIG. 6C, a region with a greater pressure fluctuation is present between the front support link 8 and the main strut member 2 in the forward and the rearward direction. From this, it is presumed that the noise generation mechanism of the front support link 8 is such that the noise is generated due to the fact that the airflow velocity in the region in the vicinity of the front support link 8 is high and the airflow fluctuation in the region in the vicinity of the front support link 8 is great, and therefore corresponds to the mechanisms of the above (1) and (2) described with reference to FIG. 1.

Figure 7A:
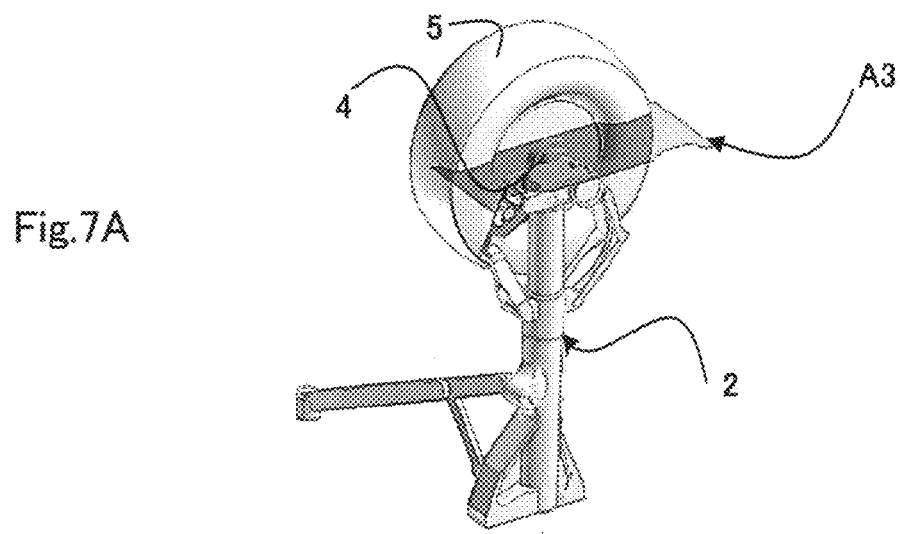
Figure 7B:
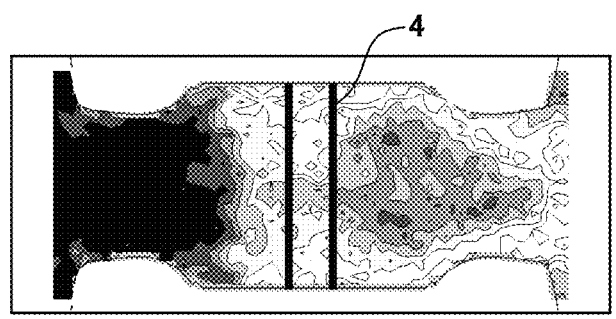
Figure 7C:
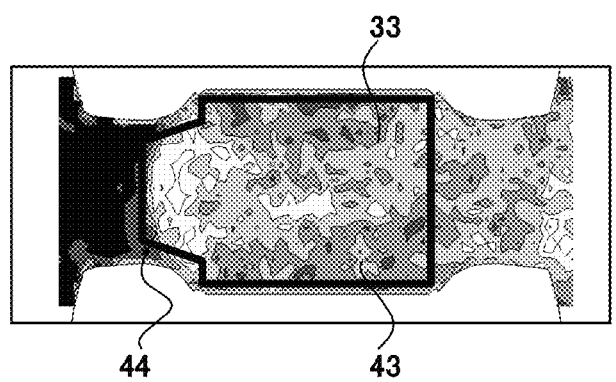

FIG. 7B is a contour view showing a frequency analysis result (1000 Hz) of a pressure fluctuation in the analyzed cross-section A3 of the original shape. With reference to FIG. 7B, a pressure fluctuation in a center region in a rightward and leftward direction, where the axle 4 passes is great. That is, it is presumed that the noise generation mechanism at the tip end portion of the main strut member 2 is such that the noise is generated due to that fact that the airflow fluctuation in the region in the vicinity of the axle 4 is great and corresponds to the mechanism of the above (2) with reference to FIG. 1.

Figure 8:
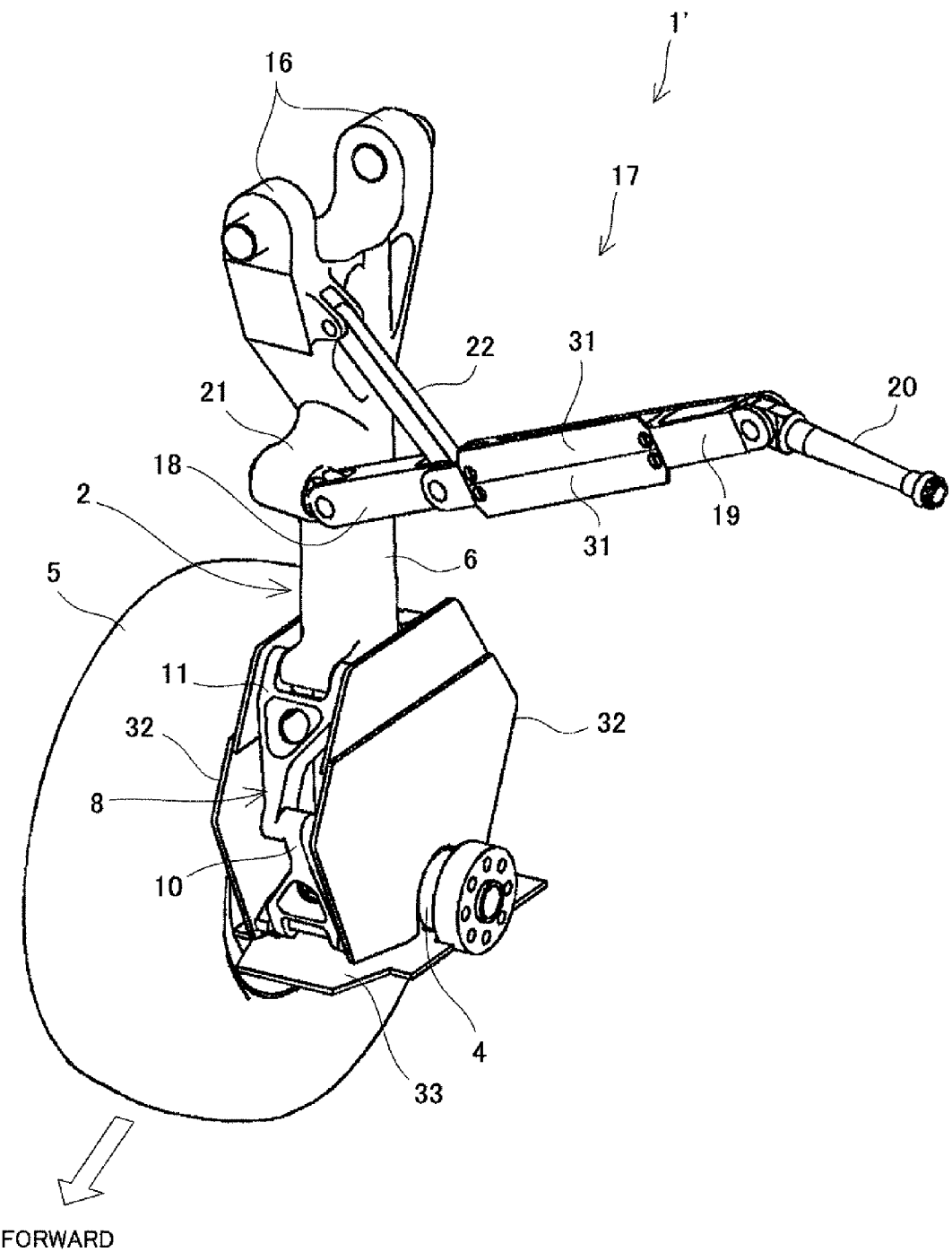
FIG. 8 is a perspective view showing a landing gear structure of airplane of the present invention.
Figure 9A:
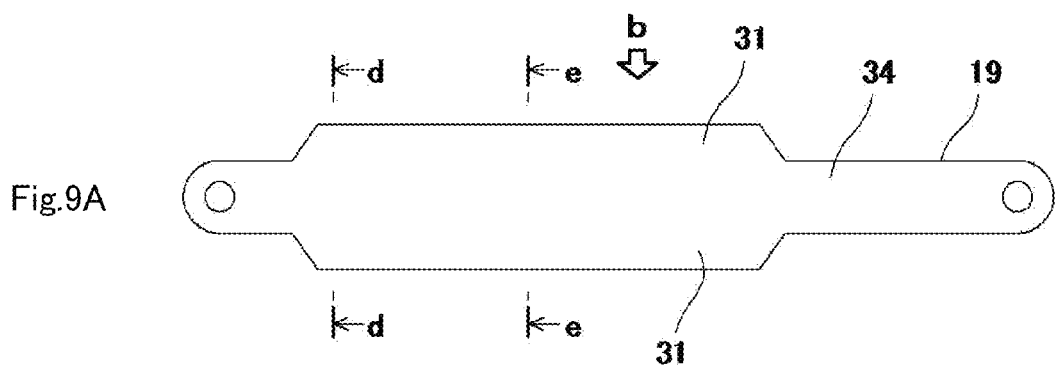
FIG. 9A is a front view of a side link of FIG. 8.
Figure 9B:
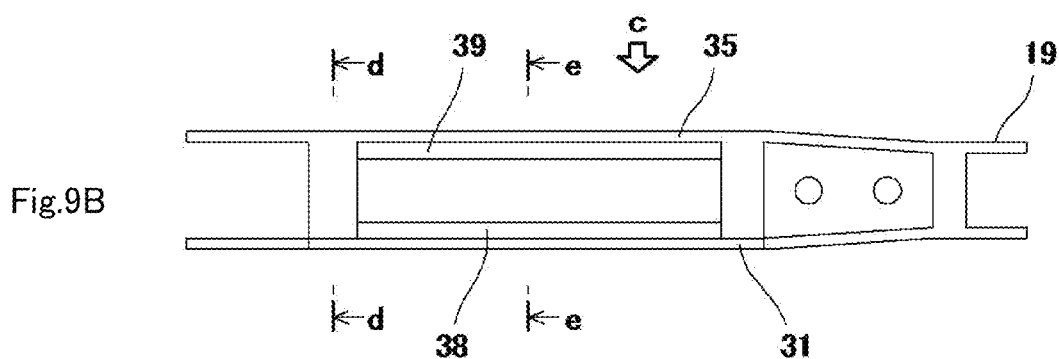
FIG. 9B is a plan view of a link member.
Figure 9C:
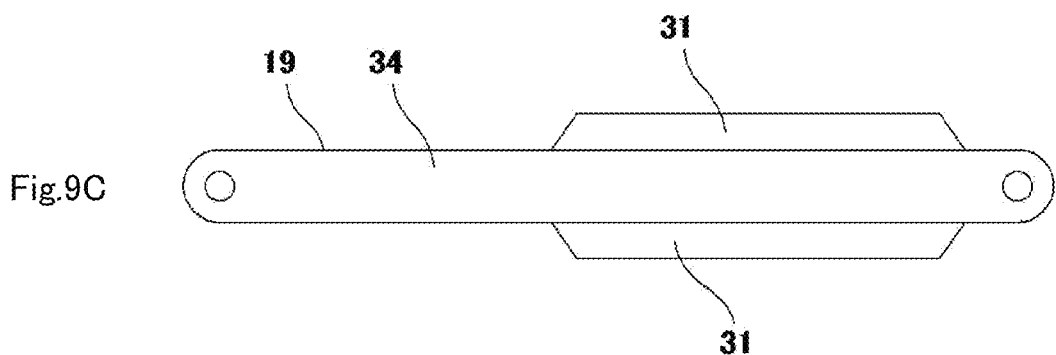
FIG. 9C is a rear view of the side link.
Figure 9D:
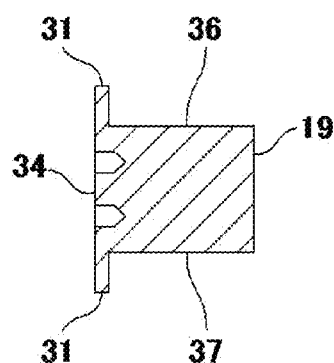
FIG. 9D is a cross-sectional view of the side link taken along line d-d of FIG. 9A.
Figure 9E:
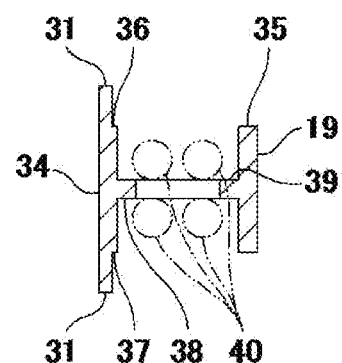
FIG. 9E is a cross-sectional view of the side link taken along line e-e of FIG. 9A.

FIG. 8 is a perspective view of a landing gear structure 1' formed by adding the shapes for attenuating the noise to these noise sources according to their noise generation mechanisms. The landing gear structure 1' shown in FIG. 6 is different from that shown in FIG. 2, but the same components are designated by the same reference numerals and will not be described repetitively. As shown in FIG. 8, the second side link 19 is provided with fence sections 31 (first noise attenuating section) to have a wider front surface. The lateral side of the support links 8 and 9, and the lateral side of the main strut member 2 are covered with a pair of side plates 32 (second noise attenuating section), while the underside of the axle 4 and the support links 8 and 9 are covered with a lower plate 33 (third noise attenuating section). Furthermore, each of the side plates 32 is disposed in a space between the support links 8 and 9 and the wheel component 5, while the lower plate 33 is disposed between the right and left wheel components 5.

FIGS. 9A to 9D show the fence sections 31. The second side link 19 added with the fence sections 31 has a structure in which a pair of T-shaped members are provided continuously with each other such that their webs face each other In a state where the main strut member 2 protrude from the lower part of the airframe, flanges 34 and 35 of the respective T-shaped members are directed forward and rearward, respectively. The front flange 34 has a larger width than the rear flange 35. Portions of the front flange 34 which protrude outward relative to the rear flange 35 form the fence sections 31, respectively.

In the present embodiment, the fence sections 31 protrude in a height direction of the flange at both sides relative to the rear flange 35 to allow the front flange 34 to have a larger width than the rear flange 35. In the present embodiment, the fence sections 31 are integral with the front flange 34. The flange sections 31 protrude vertically outward from upper and lower end surfaces 36 and 37 of the front flange 34, respectively.

In a space defined by the front and rear flanges 34 and 35 and webs 38 and 39, tubes 40 and the like, are disposed to feed and discharge hydraulic oil with respect to hydraulic devices included in the landing gear structure.

Figure 5E:
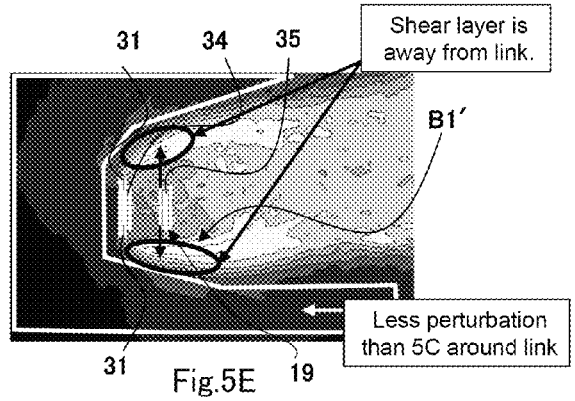

Turning back to FIGS. 5A to 5D, FIG. 5D shows a frequency analysis result (125 Hz) of a pressure fluctuation in the analyzed cross-section A1 after adding the fence sections 31 and FIG. 5E shows a frequency analysis result (1000 Hz) of a pressure fluctuation in the analyzed cross-section A1.

When comparison between FIG. 5C and FIG. 5E is made, the position of the start point of the shear layer changes from the end edge of the front flange 34 forming an original shape of the second side link 19 into the end edges of the fence sections 31, as a result of the addition of the fence sections 31 to the second side link 19. In this way, since the position of the start point of a shear layer B1' changes outward relative to the position of the start point of the original shape before adding the fence sections, the shear layer B1' extending rearward from the start point is farther from the rear flange 35, and the tubes 40 (see FIG. 9) disposed in the space defined by the webs 38 and 39 and the flanges 34 and 35. When comparison between FIG. 5B and FIG. 5D is made, a pressure fluctuation in a region behind the second side link is mitigated in a low frequency band.

Figure 12B:
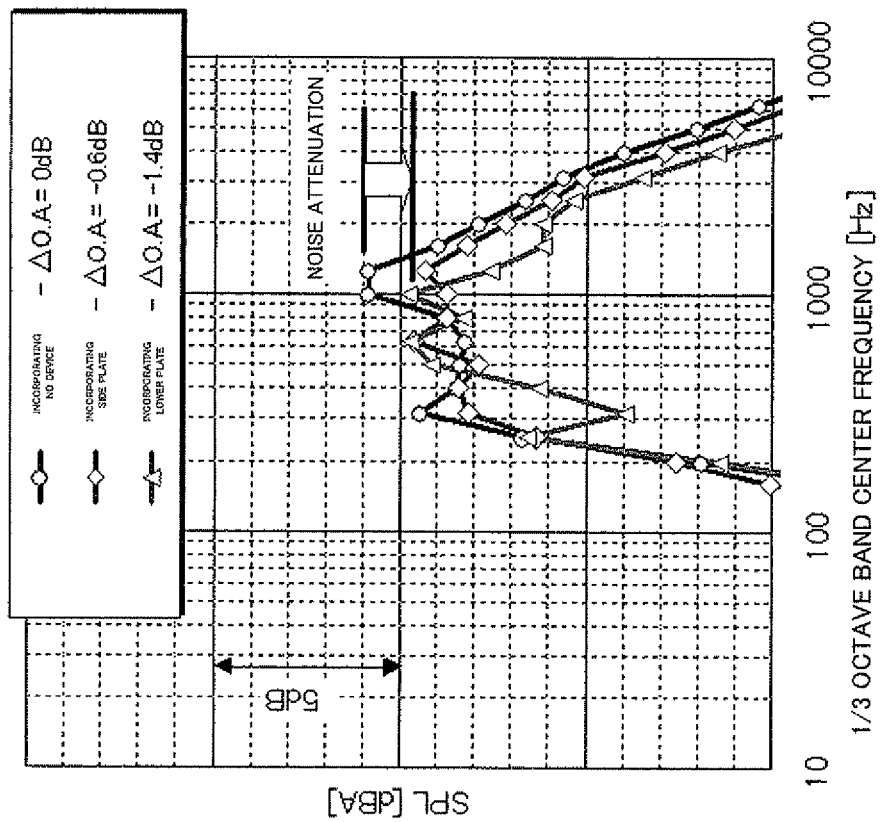
Figure 12A:
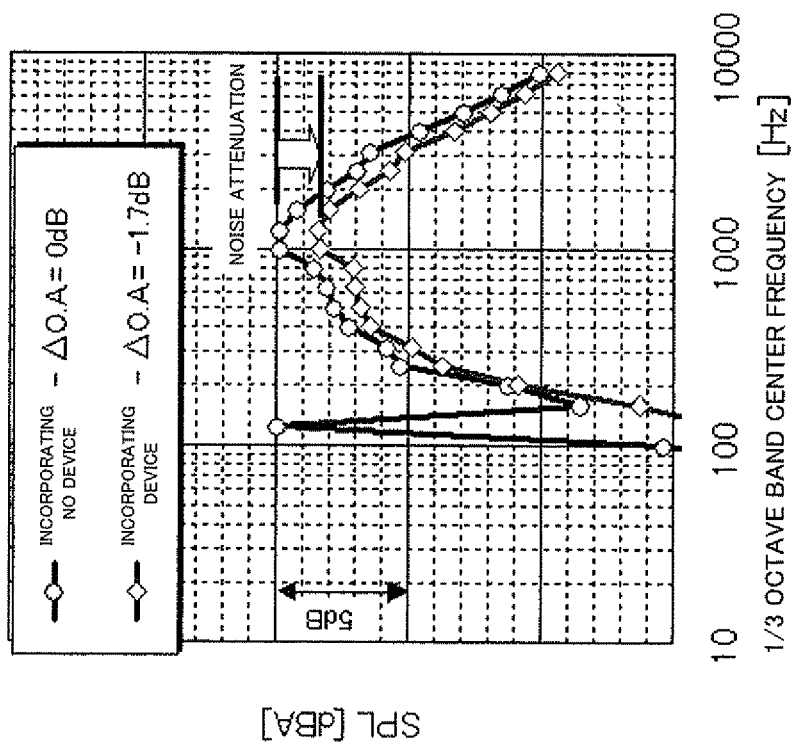

FIG. 12A shows noise characteristics of the second side link 19 obtained by wind-tunnel tests using a scale model of the landing gear structure of the original shape before adding the fence sections 31 and a scale model of the landing gear structure after adding the fence sections 31. In FIG. 12A, A-weighted sound pressure levels of ⅓ octave band center frequency are depicted, as the noise characteristics. A line connecting circular plots indicates the noise characteristic before adding the fence sections 31, while A line connecting rhombic plots indicates the noise characteristic after adding the fence sections 31. As shown in FIG. 12A, it is found out that the A-weighted sound pressure level is reduced over the overall frequency in the noise characteristic after adding the fence sections 31. In particular, it is found out that noise observed noticeably in the low-frequency band before adding the fence sections 31 can be attenuated significantly.

The fence sections 31 are formed by a simple structure in which only two plates are provided on the front flange of the second side link 19 to increase the height of the front flange. Therefore, unlike the conventional structure, the forward side of the up-down mechanism 17 is not entirely covered, a weight does not increase and ease of maintainability is not lessened. The simple structure for avoiding the noise is achieved in such a manner that the noise generation mechanism is analyzed by the CFD analysis and only a least structure required to avoid the noise generated by the mechanism is incorporated.

Although a structure in which the fence sections 31 are formed integrally with the second side link 19 is exemplarily discussed, for example, a separate plate forming the fence sections may be fastened to the second side link 19. In addition, the above shape of the second side link 19 is exemplary and other shapes may be suitably used. The fence sections 31 may be formed by making the width of the front surface of the second side link 19 larger than the width of the portion behind the front surface. Therefore, the fence sections 31 may be formed by making a width of a portion behind the front surface, for example, a width of the rear flange 35 smaller than the width of the front surface, instead of making the width of the front surface of the second side link 19 larger than the width of the portion behind the front surface like the above embodiment.

Figure 10A:
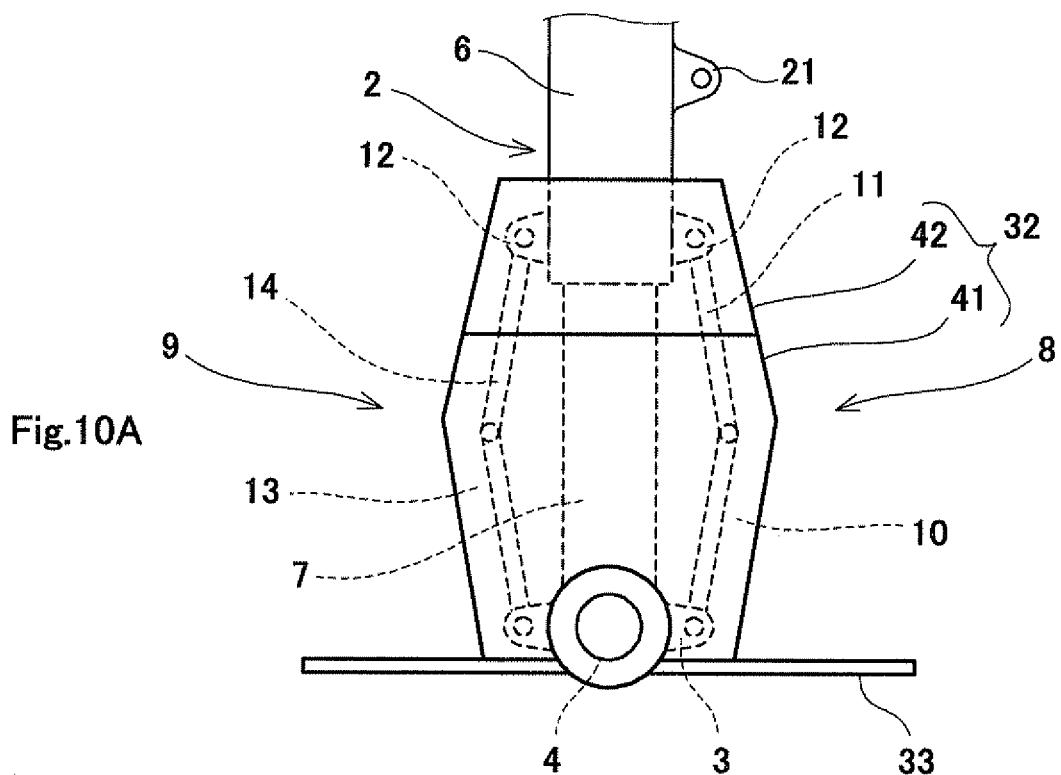
FIG. 10A is a partial side view of the landing gear structure in a case where a stroke of a rod is maximum and FIG. 10B is a partial side view of the landing gear structure in a case where the stroke of the rod is minimum.
Figure 10B:
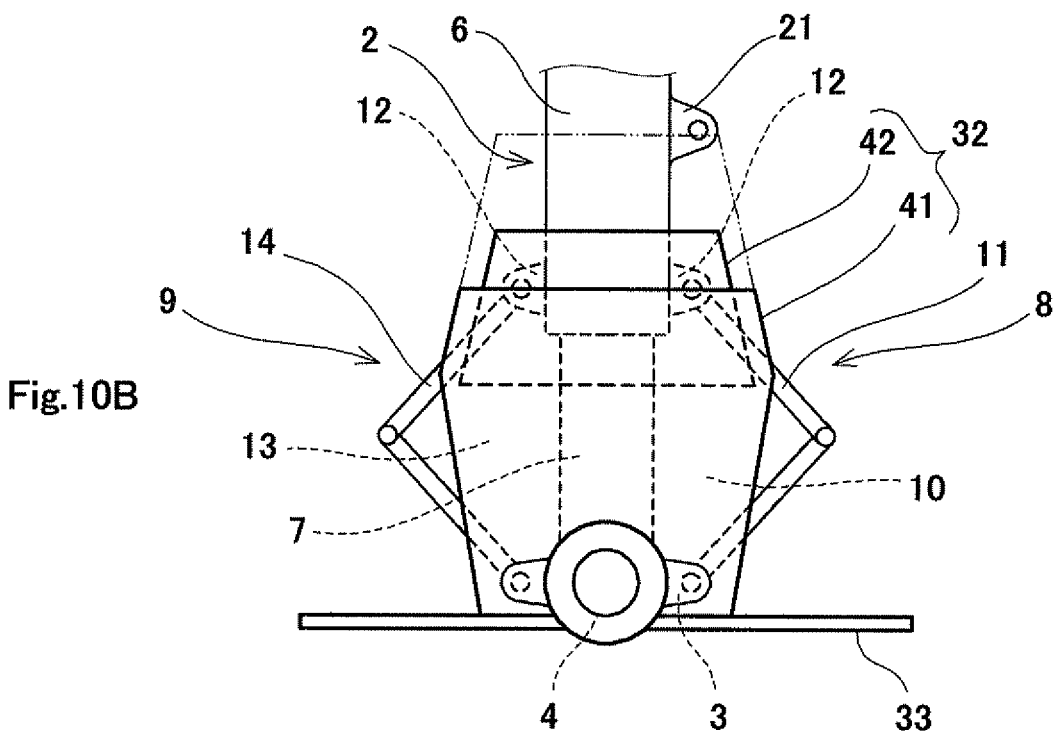

FIGS. 10A and 10B show the side plate 32. The side plate 32 has a first side plate 41 fastened to the bracket 3 and a second side plate 42 fastened to the cylinder 6 of the main strut member 2. As shown in FIG. 10A, in a state where no load is applied to the wheel component 5 and the rod 7 has a maximum stroke, an upper edge of the first side plate 41 and a lower edge of the second side plate 42 substantially conform to each other in a side view, and the front and rear support links 8 and 9 are covered with the first and second side plates 41 and 42.

As shown in FIG. 10B, in a state where a load is applied to the wheel component 5 and the rod 7 has a minimum stroke, a vertical distance between pivots of the first arms 10 and 13 with respect to the rod, and pivots of the second arms 11 and 14 with respect to the cylinder 6, is smaller than that in the state shown in FIG. 10A. The second side plate 42 is positioned closer to the rod relative to the first side plate 41 in the rightward and leftward direction. In a plan view, the first and second side plates 41 and 42 do not overlap with each other (see FIG. 8, etc.). As the rod 7 moves to be stored into the cylinder 6, the second side plate 42 moves downward inwardly relative to the first side plate 41 and overlaps with the first side plate 41 in a side view.

In the present embodiment, in the state where the stroke of the rod 7 is minimum, the second side plate 42 hides inwardly the first side plate 41. In FIG. 10B, an imaginary line indicates a state where the second side plate 42 does not move vertically. A mounting member is provided integrally on an outer surface of the cylinder 6 to pivotally mount the first side link 17 of the up-down mechanism 17. In a structure in which the second side plate does not move, it interferes with the mounting member. In the present embodiment, the second side plate 42 is vertically movable according to the operation of the main strut member 2 constituting the oleo-pneumatic shock absorber. Therefore, there is no chance that the side plate 32 will interfere with the main strut member 2.

In the state shown in FIG. 10A, the side plate 32 entirely has a hexagonal shape. This shape is designed to cover the front and rear support links 8 and 9 each having a L-shape. Because of this, the shape of the side plate 32 may be suitably changed according to a change in the shape of the front and rear support links 8 and 9. In the present embodiment, the front and rear support links 8 and 9 protrude outward in the forward and rearward direction, in the state where the stroke of the rod 7 is minimum than in the state where the stroke of the rod 7 is maximum.

Figures 6D, 6E:
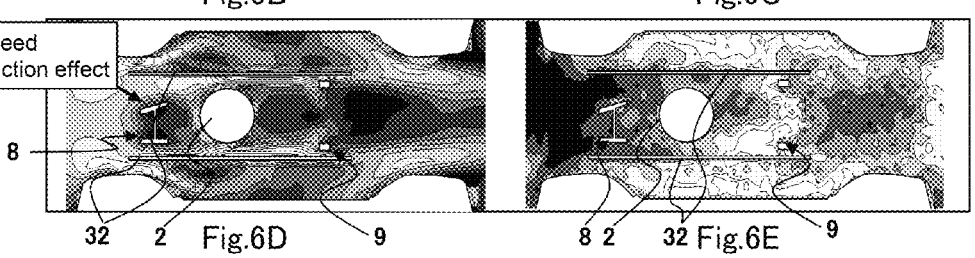

Turning back to FIG. 6, FIG. 6D is a contour view showing an average velocity distribution in the analyzed cross-section A2 after adding the side plate 32 and FIG. 6E is a contour view showing a frequency analysis result (1000 Hz) of a pressure fluctuation in the analyzed cross-section A2.

As can be seen from comparison between FIGS. 6B and 6D, an airflow velocity in a region lateral relative to the front and rear support links 8 and 9 is significantly reduced. This may be due to the fact that a static pressure in the region lateral relative to the front and rear support links 8 and 9 increases because of the placement of the side plates 32. As can be seen from comparison between FIGS. 6C and 6E, a pressure fluctuation in a region between the main strut member 2 and the front support link 8 is mitigated.

Figures 6F, 6G:
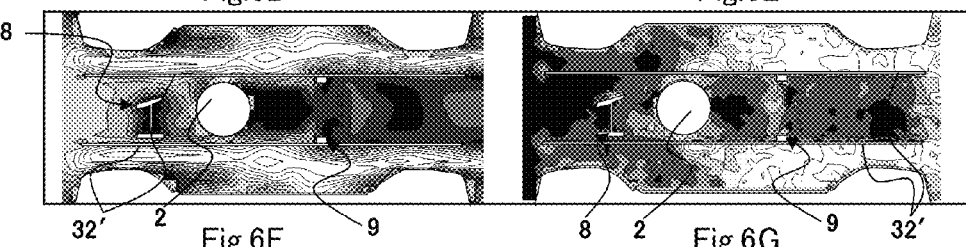

FIG. 6F is a contour view showing an average velocity distribution in the analyzed cross-section A2 after adding a side plate 32' different from the side plate 32 of FIG. 10. FIG. 6G is a contour view showing a frequency analysis result (1000 Hz) of a pressure fluctuation in the analyzed cross-section A2. The side plate 32' has larger protruding portions at both sides in the forward and rearward direction than the side plate 32 of FIG. 10.

As can be seen from comparison between FIGS. 6D and 6F, if a dimension of the side plate in the forward and rearward direction is too long, a space defined by the front wheel component 5 and the side plate 32' is narrower, and it is difficult to reduce an airflow velocity in this narrow region. Therefore, in this case, the noise cannot be attenuated effectively, and there is a chance that a desired noise requirement cannot be satisfied. The side plate 32 of FIG. 10 is positioned so as not to make the space between the side plate 32 and the wheel component 5 narrow, and has a dimension in the forward and rearward direction that is great enough to cover the lateral side of the front and rear support links 8 and 9. This makes it possible to reduce the airflow velocity in the region in the vicinity of the front and rear support links 8 and 9 without causing a secondary increase in the airflow velocity.

Figure 11:
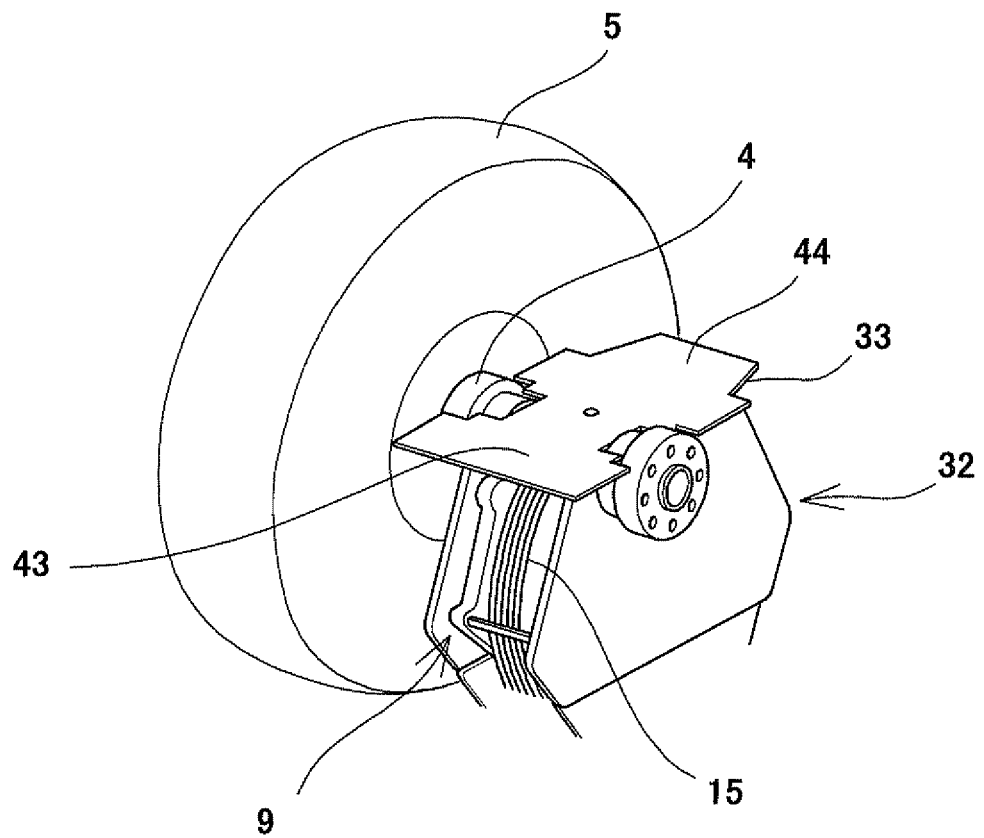
FIG. 11 is a perspective view showing the landing gear structure of FIG. 8 as shown from below.

FIG. 11 shows the lower plate 33. The lower plate 33 is provided to cover the underside of the axle 4 and positioned between the right and left wheel components 5. Each wheel component 5 includes a wheel and a tire mounted to the wheel. The tire is disposed to protrude outward in a rightward and leftward direction with respect to the wheel. The lower plate 33 includes an inter-wheel closing section 43 for closing a space between the wheels and a forward inter-tire closing section 44 for closing a space between portions of the tires which are forward relative to the wheels. Since the tire is mounted to the wheel in this way, the forward inter-tire closing section 44 has a smaller width in the rightward and leftward direction than the inter-wheel closing section 43.

Turning back to FIG. 7, FIG. 7C is a contour view showing a frequency analysis result (1000 Hz) of a pressure fluctuation in the analyzed cross-section A3 after adding the lower plate 33. As can be seen from comparison between FIGS. 7B and 7C, a pressure fluctuation generated in a region in the vicinity of the axle 4 is mitigated significantly.

Figure 7D:
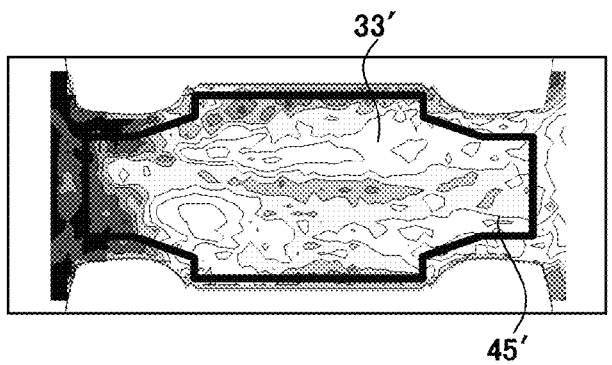

FIG. 7D is a contour view showing a frequency analysis result (1000 Hz) of a pressure fluctuation in the analyzed cross-section A3 after adding a lower plate 33' different from the lower plate 33 of FIG. 11. The lower plate 33' further has a rearward inter-tire closing section 45' for closing a space between portions of the tires which are rearward relative to the wheels, in addition to the shape of the lower plate 33 of FIG. 10. As can be seen from comparison among FIGS. 7B to 7D, in a state where the space between the right and left wheel components 5 is closed substantially entirely, a space on the inner surface side (upper side) of the lower plate 33 is made narrower in the forward and rearward direction, and therefore, a pressure fluctuation in this region is high. In the present embodiment, it is possible to prevent a pressure fluctuation from increasing because the lower plate 33 has an open rearward portion.

Figures 6H, 6I:
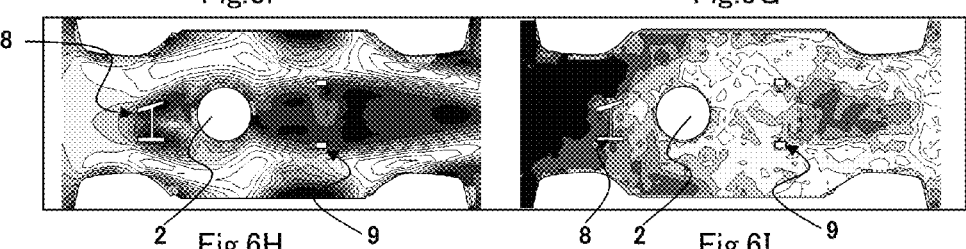

Turning back to FIG. 6, FIG. 6H is a contour view showing an average velocity distribution in the analyzed cross-section A2 after adding the lower plate 33 and FIG. 6I is a contour view showing a frequency analysis result (1000 Hz) of a pressure fluctuation in the analyzed cross-section A2.

As can be seen from comparison between FIGS. 6B and 6H, in particular, an airflow velocity in the region lateral relative to the front support link 8 is reduced. This may be due to the fact that a static pressure in a region in the vicinity of the front support link 8 increases because of the placement of the lower plate 33. As can be seen from comparison between FIGS. 6C and 6I, a pressure fluctuation in a space between the main strut member 2 and the front support link 8 is mitigated.

Figures 6J, 6K:
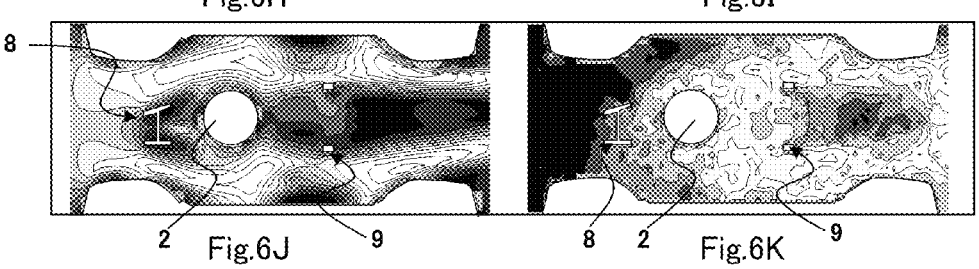

FIG. 6J is a contour view showing an average velocity distribution in the analyzed cross-section A2 after adding the lower plate 33' and FIG. 6K is a contour view showing a frequency analysis result (1000 Hz) of a pressure fluctuation in the analyzed cross-section A2. By adding the lower plate 33', an airflow velocity is reduced, and a pressure fluctuation is mitigated, like the shape added with the lower plate 33 of FIGS. 6H and 6I.

FIG. 12B shows a noise characteristic of the tip end portion of the main strut member 2 derived from the wind-tunnel test using the scale model of the landing gear structure of the original shape before adding the side plate 32 and the lower plate 33 and a noise characteristic of the tip end portion of the main strut member 2 derived from the wind-tunnel test using the scale model of the landing gear structure after adding the side plate 32 or the lower plate 33. FIG. 12B shows A-weighted sound pressure levels of a ⅓ octave band center frequency as the noise characteristics. A line connecting circular plots indicates the noise characteristic before adding the side plate 32 and the lower plate 33. A line connecting rhombic plots indicates the noise characteristic after adding the side plate 32. A line connecting triangular plots indicates the noise characteristic after adding the lower plate 33. As can be seen from FIG. 12B, the A-weighted sound pressure level is reduced over the overall frequency in the shape formed by adding the side plate 32 or the lower plate 33. In particular, it is found out that noise observed noticeably in a high-frequency band before adding the plates 32 and 33 is attenuated significantly.

The side plate 32 has a simple structure for covering only the lateral side of the front and rear support links 8 and 9 which are functional components attached to the tip end portion of the main strut member 2. The lower plate 33 has a simple structure for covering only the underside of the axle 4 which is the functional component mounted to the tip end portion of the main strut member 2. Although the lower plate 33 is disposed between the wheel components 5, a space behind the lower plate 33 is open. As should be understood, unlike the conventional structure, the forward side and underside of these functional components are not entirely covered, an increase in weight does not occur, and ease of maintainability is not lessened. The simple structure for avoiding the noise is achieved in such a manner that the noise generation mechanism is analyzed by the CFD analysis and only a least structure required for avoiding the noise generated by the mechanism is incorporated.

The shape of the side plates 32 is set so as to cover the front and rear support links 8 and 9 during flying when the stroke of at least the main strut member 2 is maximum. Because of this, the dimension of the side plate 32 in the forward and rearward direction can be reduced as much as possible while effectively attenuating the noise during flying. Thus, both of attenuation of the noise and reduction of the weight can be achieved.

Although in the present embodiment, each side plate 32 is composed of two members to avoid interference with the main strut member 2 constituting the oleo-pneumatic shock absorber, the side plate 32 does not need to be composed of the two members but may be composed of three or more components so long as interference with the main strut member 2 can be avoided.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention achieves an advantage that a noise of a designed object of aircraft is attenuated by adding an object of a simple shape, and is widely applicable to design of the aircraft.

REFERENCE SIGNS LISTS 1 landing gear structure
2 main strut member
4 axle
5 wheel component
6 piston
7 rod
8, 9 support link
17 up-down mechanism
18~20 side link
31 fence section (first noise attenuating section)
32 side plate (second noise attenuating section)
33 lower plate (third noise attenuating section)
41 first side plate
42 second side plate

The invention claimed is:

1. A landing gear structure of aircraft comprising:
a main strut member for supporting wheel components at a tip end portion thereof;
a functional component provided at the main strut member; and
a first noise attenuating section for increasing a static pressure in the vicinity of the functional component to reduce airflow speed, thereby attenuating an amount of aerodynamic noise produced by the functional component,
wherein the main strut member is extendible and contractible in a lengthwise direction, and includes a cylinder portion which is supported on an airframe, and a rod portion protrusively stored into the cylinder portion,
wherein the functional component includes a first support link and a second support link provided between the cylinder portion and the rod portion such that the support link extends over the cylinder portion and the rod portion,
wherein a portion of the functional component, which portion is upstream in an airflow direction, is opened, and the first noise attenuating section has a flat plate shape, and covers a lateral side of the functional component and a lateral side of the main strut member;
wherein each support link includes a first arm coupled to the rod portion, and a second arm coupled to the cylinder portion such that the second arm is pivotally attached to the first arm,
wherein the first noise attenuating section includes a first side plate fastened to the first arm, and a second side plate fastened to the second arm and positioned closer to the main strut member relative to the first side plate,
wherein the first noise attenuating section comprises the first side plate being fastened to a bracket and the second side plate being fastened to the cylinder portion of the main strut member,
wherein each support link is covered with the first and second side plates when the rod portion is at a maximum stroke,
wherein an upper edge of the first side plate and a lower edge of the second side plate substantially conform to each other when the rod portion is at the maximum stroke, and
wherein the second side plate is movable in the lengthwise direction of the main strut member, and
wherein the second side plate moves downward inwardly relative to the first side plate and overlaps with the first side plate according to movement of the rod portion protruding from and stored into the cylinder portion.

2. The landing gear structure of aircraft according to claim 1, further comprising:
an up-down mechanism for moving up and down the main strut member; and
a second noise attenuating section for attenuating an amount of aerodynamic noise produced by the up-down mechanism,
wherein the up-down mechanism includes an exposed member which is exposed outside of the airframe during down movement of the main strut member and
wherein the second noise attenuating section has a flat plate shape and is provided continuously with a surface of the exposed member, the surface facing an upstream side in the airflow direction, to change a position of a start point of a shear layer to an edge portion of the flat plate shape of the second noise attenuating section, to make the shear layer farther from a portion of the exposed member which portion is a downstream side of the second noise attenuating section in the airflow direction.

3. An aircraft including the landing gear structure according to claim 1.

\* \* \* \* \*